Figure 1:
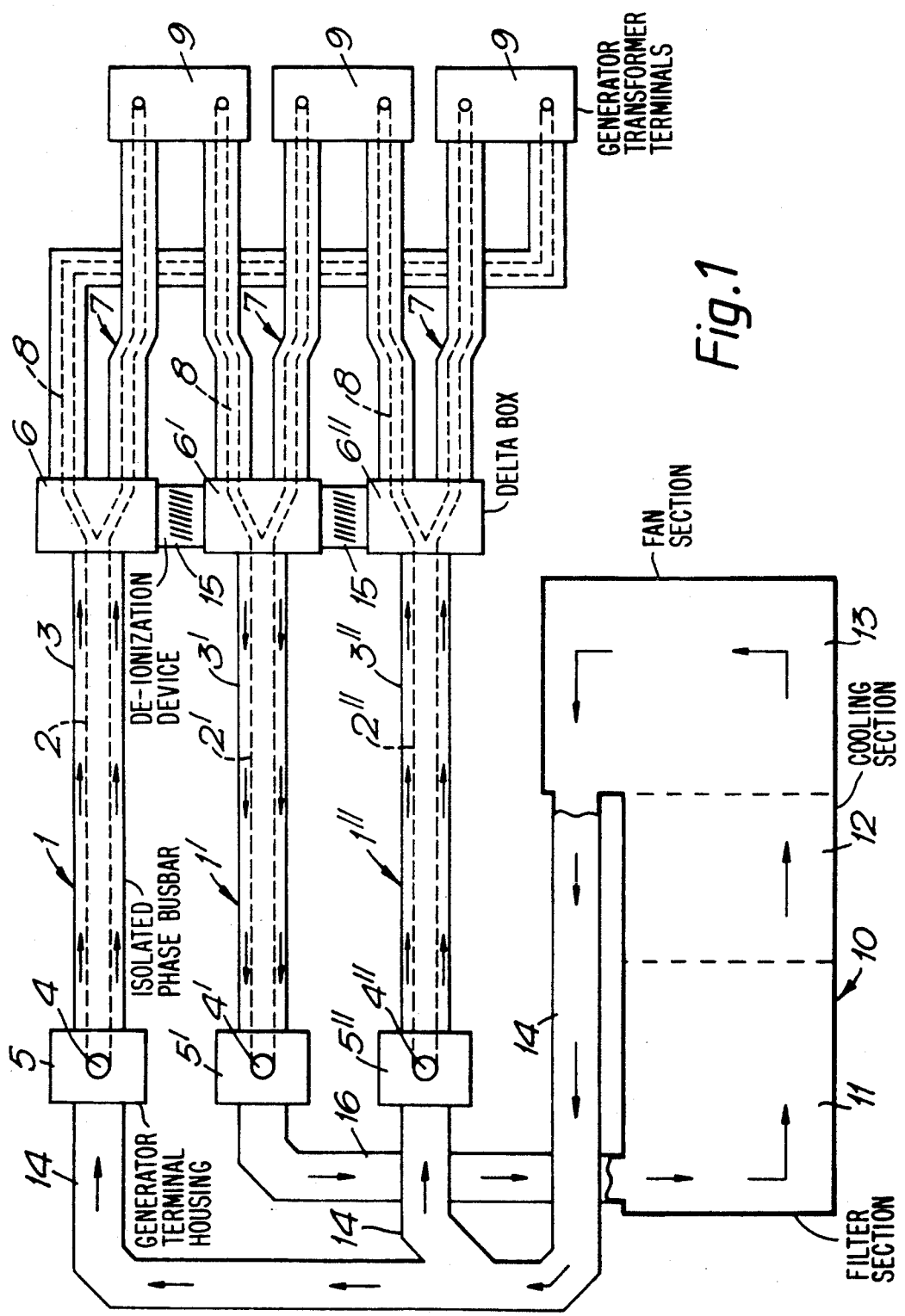

United States Patent [19]

Martin

[11] Patent Number: 5,173,572
[45] Date of Patent: Dec. 22, 1992

[54] ISOLATED PHASE BUSBAR INSTALLATION

[75] Inventor: Antony D. Martin, Wirral, United Kingdom

[73] Assignee: BICC Public Ltd. Company, England

[21] Appl. No.: 666,628

[22] Filed: Mar. 8, 1991

[30] Foreign Application Priority Data

Mar. 8, 1990 [GB] United Kingdom ............... 9005243

[51] Int. Cl.$^5$ ............................................. H02G 5/10
[52] U.S. Cl. ................................. 174/16.2; 174/68.2; 174/70 B; 174/99 B
[58] Field of Search ................... 174/16.2, 68.2, 70 B, 174/99 B; 165/80.3

[56] References Cited

U.S. PATENT DOCUMENTS

| | | | |
|---|---|---|---|
| 3,015,743 | 1/1962 | Skeats | 174/99 B |
| 3,020,329 | 2/1862 | Deans | 174/16.2 |
| 3,230,293 | 1/1966 | Turgeon | 174/16.2 |
| 3,639,673 | 2/1972 | Fujisaki et al. | 174/16.2 |
| 3,654,378 | 4/1972 | Rehder | 174/16.2 |
| 3,740,925 | 6/1973 | Gothard | 174/16.2 |

Primary Examiner—Morris H. Nimmo
Attorney, Agent, or Firm—Anthony J. Casella; Gerald E. Hespos

[57] ABSTRACT

An isolated phase busbar installation has a closed circulatory cooling system in which a deionization device is interconnected between the tubular enclosures of two isolated phase busbars of the installation between which air is caused to flow. The deionization device comprises an open-ended metal tubular housing which is connected to earth and which has, extending transversely across the bore and dividing the bore throughout its length into a plurality of passages, a plurality of mutually spaced metal sheets. Each metal sheet has a plurality of transversely extending convolutions at spaced positions along the length of the housing so that each passage follows an undulating path. The number of metal sheets and the number and amplitude of the convolutions of each sheet and the dimensions of each passage having regard to the volume and velocity of air flowing from the tubular enclosure of one of said busbars through the tubular housing to the tubular enclosure of the other of said busbars are such that no contaminants are carried by flow of air from one tubular enclosure to the other.

8 Claims, 2 Drawing Sheets

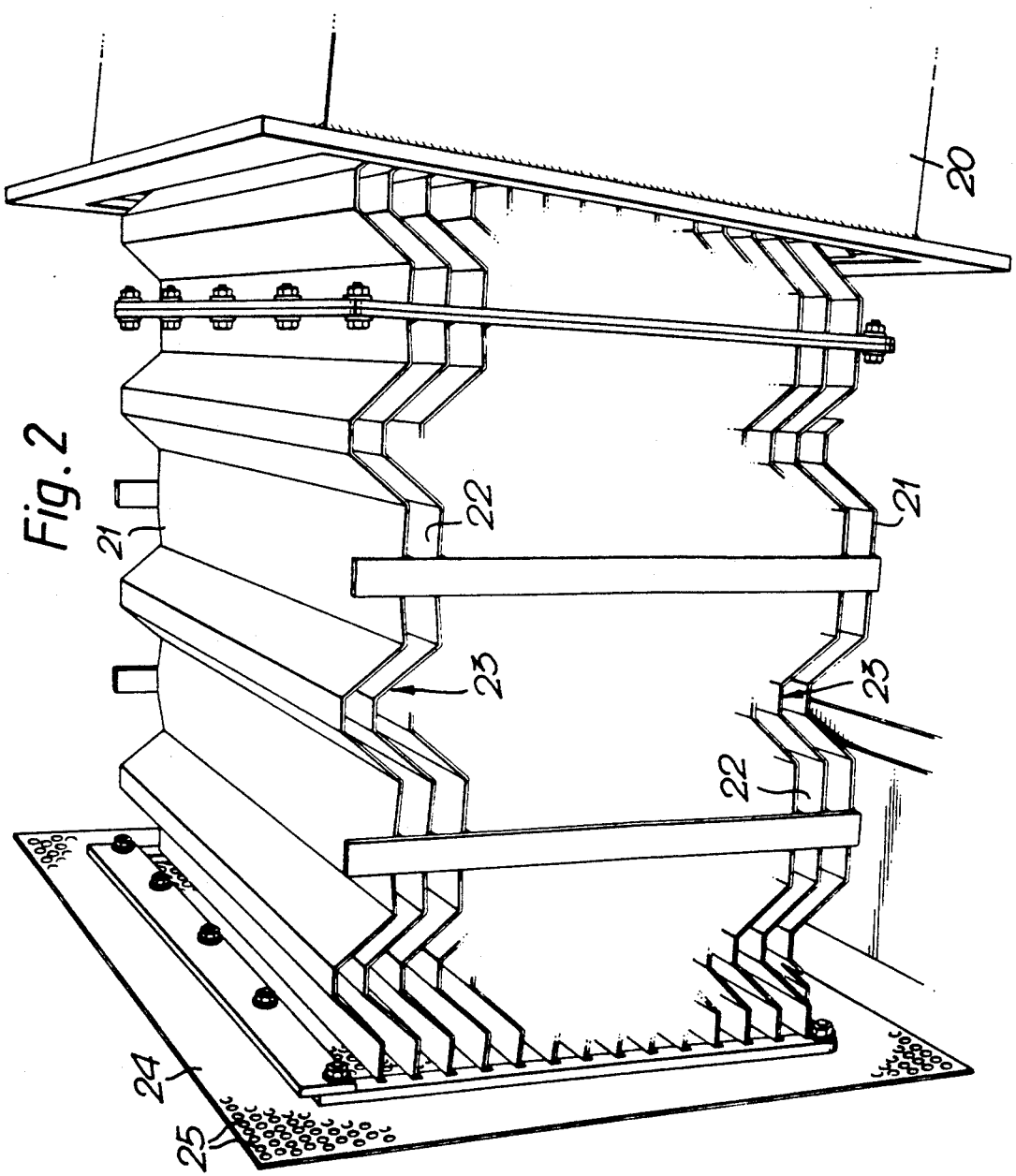

ISOLATED PHASE BUSBAR INSTALLATION

This invention relates to isolated phase busbar installations of the kind employed to provide a permanent electrical connection between a generator in a power station and the generator transformer.

An isolated phase busbar installation in general use comprises three isolated phase busbars, one for each phase, each consisting of a tubular conductor supported coaxially within a tubular enclosure of electrically conductive metal or metal alloy at each of a plurality of positions mutually spaced along the length of the conductor by at least one electric insulator assembly. For generators having a capacity up to 660 megawatts, it is common practice for the isolated phase busbars of the installation to be naturally air cooled and in a standard air-cooling installation heat generated by the electric current flowing along a busbar is dispersed by radiation and convection to the air around the installation. Each isolated phase busbar of an installation electrically connected to a generator having a capacity of 660 megawatts typically will have a tubular enclosure of a diameter of approximately 1.5 m. An isolated phase busbar installation electrically connected to a generator having a capacity in excess of 660 megawatts, if cooled by natural air cooling, would require isolated phase busbars of such dimensions that they become impractical. The amount of space available within a power station imposes limitations on the size of the isolated phase busbars of an installation, independent of any engineering considerations.

As a consequence, for generators having a capacity greater than 300 megawatts, such as generators used in sophisticated power stations and having a capacity of at least 500 megawatts, it is the practice to employ an alternative cooling system for the isolated phase busbar installation which enables isolated phase busbars of acceptable dimensions to be used. In a preferred cooling system currently used for an isolated phase busbar installation to be electrically connected to a generator having a capacity greater than 660 megawatts, the isolated phase busbars are interconnected in a closed circulatory cooling system through which air is caused to flow. Usually, air is caused to flow down the tubular enclosures of two isolated phase busbars connected in parallel in the circulatory system and, from the downstream ends of these two busbars, air from the tubular enclosures of these two busbars is caused to flow back down the tubular enclosure of the third isolated phase busbar. This arrangement ensures that the air, which is quite warm after cooling the first two isolated phase busbars, has sufficient heat absorption capacity to extract heat from the third isolated phase busbar. When such a forced air cooling system is employed to cool an isolated phase busbar installation electrically connected to a generator having a capacity of 1000 megawatts, the diameter of the tubular enclosure of each busbar can be restricted to 1.3 m.

With a view to ensuring that when air passes from the tubular enclosure of one isolated phase busbar to the tubular enclosure of another isolated phase busbar dielectric integrity is maintained, i.e. that substantially no contaminants flow with the air from one tubular enclosure to the other, it has been proposed to inter-connect in the closed circulatory cooling system between the tubular enclosures of two isolated phase busbars between which air is caused to flow, a device for extracting substantially all contaminants from the air flowing from the tubular enclosure of one isolated phase busbar to the tubular enclosure of the other isolated phase busbar, such a device, for convenience, hereinafter being referred to as a "deionization device".

It is an object of the present invention to provide a closed circulatory cooling system of an isolated phase busbar installation in which an improved deionization device is interconnected between the tubular enclosures of two isolated phase busbars of the installation between which air is caused to flow, which improved deionization device will extract substantially all contaminants from air flowing from the tubular enclosure of one busbar to the tubular enclosure of the other.

According to the invention, the improved deionization device comprises an open-ended tubular housing of metal or metal alloy which is connected to earth and, extending transversely across the bore of the housing and dividing said bore throughout its length into a plurality of passages, a plurality of mutually spaced sheets of metal or metal alloy each having a plurality of transversely extending convolutions at spaced positions along the length of the housing so that each passage follows an undulating path, the number of metal sheets and the number and amplitude of the convolutions of each sheet and the dimensions of each passage having regard to the volume and velocity of air flowing from the tubular enclosure of one isolated phase busbar through the tubular housing to the tubular enclosure of the other isolated phase busbar being such that substantially no contaminants are carried by flow of air from one tubular enclosure to the other tubular enclosure.

The open-ended tubular housing of the improved deionization device may be of any convenient transverse cross-section but, preferably, the transverse cross-section of the tubular housing is of substantially rectangular shape.

With a view to causing turbulence of the air flowing into the upstream end of the open-ended tubular housing of the improved deionization device, preferably a sheet of metal or metal alloy having a multiplicity of mutually spaced perforations or other holes overlies the upstream end of the tubular housing.

Each transversely extending convolution of each metal sheet may be of any convenient transverse cross-section but, for reasons of ease of manufacture, preferably each convolution in each sheet is in the shape of a channel having a substantially flat base and side walls inclined at an obtuse angle to the base, e.g. approximately 135°.

Preferably, the pitch between adjacent convoluted metal sheets lies in the range 0.01 to 0.5 w, where w is the distance between the outermost convoluted metal sheets and preferably, also, the amplitude of each convolution in each convoluted metal sheet lies in the range 1 to 4 p, where p is the pitch between adjacent convoluted metal sheets.

As has been explained, the number of metal sheets and the number and amplitude of the convolutions of each metal sheet and the dimensions of each passage having regard to the volume and velocity of air flowing from the tubular enclosure of one isolated phase busbar of the installation through the open-ended tubular housing to the tubular enclosure of the other isolated phase busbar of the installation will be such that substantially no contaminants are carried by flow of air from one tubular enclosure to the other tubular enclosure. By way of example, for isolated phase busbars having tubular enclosures of a diameter of 1.3 m, a preferred deionization chamber is of substantially rectangular transverse cross-section having a length of 0.75 metres, a width of 1.2 metres and a depth of 1.2 metres. Twelve metal sheets, each having a thickness of 2 mm, define eleven passages extending through the device, the pitch between adjacent metal sheets being 22 mm. Each metal sheet has five transversely extending convolutions each having an amplitude of 37 mm, the pitch between adjacent convolutions being 152 mm.

The open-ended tubular housing and convoluted metal sheets, and when present the perforated metal sheet at the upstream end of the tubular housing, of the improved de-ionisation device preferably are made of aluminium or an aluminium-based alloy but, in some circumstances, they may be made of stainless steel.

The invention also includes, for interconnection between the tubular enclosures of two isolated phase busbars of an isolated phase busbar installation, which tubular enclosures constitute parts of a closed circulatory cooling system of the installation, an improved deionization device comprising a tubular housing of metal or metal alloy which is open at each of its ends and, extending transversely across the bore of the housing and dividing said bore throughout its length into a plurality of passages, a plurality of mutually spaced sheets of metal or metal alloy each having a plurality of transversely extending convolutions at spaced positions along the length of the housing so that each passage follows an undulating path, the pitch between adjacent convoluted metal sheets of the deionization device lying in the range 0.01 to 0.5 w, where w is the distance between the outermost convoluted metal sheets, and the amplitude of each convolution in each convoluted metal sheet lying in the range 1 to 4 p, where p is the pitch between adjacent convoluted metal sheets.

The invention is further illustrated by a description, by way of example, of a preferred closed circulatory cooling system of an isolated phase busbar installation for electrical connection to a generator having a capacity of 1000 megawatts, with reference to the accompanying drawings, in which:

FIG. 1 is a schematic flow diagram of the preferred closed circulatory cooling system, and FIG. 2 is a fragmental pictorial exploded view of one of the deionization devices of the closed circulatory cooling system shown in FIG. 1.

Referring to FIG. 1, the isolated phase busbar installation comprises three isolated phase busbars 1, 1′, 1″, one for each phase, providing a permanent electrical connection between a generator (not shown) having a capacity of 1000 megawatts and the generator transformer (not shown). Each isolated phase busbar 1, 1′, 1″ consists of a tubular aluminium conductor 2, 2′, 2″ supported coaxially within an aluminium tubular enclosure 3, 3′, 3″ at each of a plurality of positions mutually spaced along the length of the conductor by three circumferentially spaced electric insulator assemblies (not shown). At one end of each isolated phase busbar 1, 1′, 1″ the tubular conductor 2, 2′, 2″ is connected within a housing 5, 5′, 5″ to a terminal 4, 4′, 4″ of the generator and, at the other end of the tubular conductor, the tubular conductor effects a bifurcated connection within a delta box 6, 6′, 6″ to the tubular conductors 8 of two isolated phase busbars 7, the tubular conductors 8 being connected to terminals 9 of the generator transformer.

The tubular enclosures 3, 3′, 3″ of the isolated phase busbars 1, 1′, 1″ of the isolated phase busbar installation, and the generator terminal housings 5, 5′, 5″ and delta boxes 6, 6′6″ connected to the ends of the tubular enclosures, are interconnected in and form parts of the preferred closed circulatory cooling system of the isolated phase busbar installation. This cooling system includes a forced air cooling plant 10 which consists of a filter section 11, a cooling section 12 and a fan section 13, the fan section being connected by air ducts 14 to the generator terminal housings 5, 5″ of the tubular enclosures 3, 3″ so that these tubular enclosures are effectively connected in parallel. The delta boxes 6, 6″ at the other ends of the tubular enclosures 3, 3″ are interconnected to the delta box 6′ of the tubular enclosure 3′ of the isolated phase busbar 1′ through improved deionization devices 15 and the generator terminal housing 5′ at the other end of the tubular enclosure 3′ is connected to the filter section 11 of the forced air cooling plant 10 via an air duct 16. Cooling air from the forced air cooling plant 10 is caused to flow via the air ducts 14 down the tubular enclosures 3, 3″ of the isolated phase busbars 1, 1″ connected in parallel in the circulatory system and, from the delta boxes 6, 6″ at the downstream ends of these tubular enclosures, air from these tubular enclosures flows through the deionization devices 15 into the delta box 6′ at the upstream end of the tubular enclosure 3′ of the isolated phase busbar 1′ and along the tubular enclosure 3′ and the through the generator terminal housing 5′ and air duct 16 back to the filter section 11 of the forced air cooling plant 10. The deionization devices 15 extract substantially all contaminants from the air flowing from the tubular enclosures 3, 3″ of the isolated phase busbars 1, 1″ to the tubular enclosure 3′ of the isolated phase busbar 1′ so that substantially no contaminants are carried by flow of air from the tubular enclosures 3, 3″ to the tubular enclosure 3′.

As will be seen on referring to FIG. 2, each of the deionization devices 15 of the preferred closed circulatory cooling system of the isolated phase busbar installation shown in FIG. 1 comprises an open ended aluminium tubular housing 20 which is connected to earth and which is of substantially square transverse cross-section having a length of 0.75 metres, a width of 1.2 metres and a depth of 1.2 metres. Extending transversely across the bore 20 and dividing the bore throughout its length into eleven passages 22 are twelve mutually spaced aluminium sheets 21 each having a thickness of 2 mm, the pitch between adjacent aluminium sheets being 22 mm Each aluminium sheet 21 has five transversely extending convolutions 23 at spaced positions along the length of the housing so that each passage 22 follows an undulating path. Each convolution 23 is in the shape of a channel having a flat base and side walls inclined at an angle of approximately 135° to the base, the amplitude of each convolution being 37 mm and the pitch between adjacent convolutions being 152 mm. An aluminium sheet 24 having a multiplicity of mutually spaced perforations 25 overlies the upstream end of the tubular housing 20, the perforated sheet causing turbulence of air flowing into the upstream end of the tubular housing.

What I claim as my invention is:

1. A closed circulatory cooling system of an isolated phase busbar installation comprising three isolated phase busbars, one for each phase, each consisting of a tubular conductor supported co-axially within a tubular enclosure of electrically conductive metal or metal alloy at each of a plurality of positions mutually spaced along the length of the conductor by at least one electric insulator assembly, wherein a deionization device is interconnected between the tubular enclosures of two isolated phase busbars of the installation between which air is caused to flow, said deionization device comprising an open-ended tubular housing of metal or metal alloy which is connected to earth and, extending transversely across the bore of said housing and dividing the bore throughout its length into a plurality of passages, a plurality of mutually spaced sheets of metal or metal alloy each having a plurality of transversely extending convolutions at spaced positions along the length of the housing so that each passage follows an undulating path, the number of metal sheets and the number and amplitude of the convolutions of each sheet and the dimensions of each passage being selected in accordance with the volume and velocity of air flowing from the tubular enclosure of one of said two busbars, through the tubular housing and to the tubular enclosure of the other said two busbars being such that substantially no contaminants are carried by flow of air from one tubular enclosure to the other tubular enclosure.

2. A closed circulatory cooling system as claimed in claim 1, wherein the transverse cross-section of the open ended tubular housing of the deionization device is of substantially rectangular shape.

3. A closed circulatory cooling system as claimed in claim 1, wherein a sheet of metal or metal alloy having a multiplicity of mutually spaced perforations overlies the upstream end of the open ended tubular housing of the deionization device.

4. A closed circulatory cooling system as claimed in claim 1, wherein each convolution in each sheet of the deionization device is in the shape of a channel having a substantially flat base and side walls inclined at an obtuse angle to the base.

5. A closed circulatory cooling system as claimed in claim 1, wherein the pitch between adjacent convoluted metal sheets of the deionization device lies in the range 0.01 to 0.5 w, where w is the distance between the outermost convoluted metal sheets, and the amplitude of each convolution in each convoluted metal sheet lies in the range 1 to 4 p, where p is the pitch between adjacent convoluted metal sheets.

6. A closed circulatory cooling system as claimed in claim 1, wherein the open ended tubular housing and convoluted metal sheets of the deionization device are made of aluminum or an aluminum-based alloy.

7. A deionization device for interconnection between the tubular enclosures of two isolated phase busbars of an isolated phase busbar installation comprising three isolated phase busbars, one for each phase, each consisting of a tubular conductor supported coaxially within a tubular enclosure of electrically conductive metal or metal alloy at each of a plurality of positions mutually spaced along the length of the conductor by at least one electric insulator assembly, which tubular enclosures constitute parts of a closed circulatory cooling system of the installation, said deionization device comprising a tubular housing of metal or metal alloy which is open at each of its ends and, extending transversely across the bore of the housing and dividing said bore throughout its length into a plurality of passages, a plurality of mutually spaced sheets of metal or metal alloy each having a plurality of transversely extending convolutions at spaced positions along the length of the housing so that each passage follows an undulating path, the pitch between adjacent convoluted metal sheets of the de-ionisation device lying in the range 0.01 to 0.5 w, where w is the distance between the outermost convoluted metal sheets, and the amplitude of each convolution in each convoluted metal sheet lying in the range to 1 to 4 p, where p is the pitch between adjacent convoluted metal sheets.

8. A deionization device as claimed in claim 7, wherein a sheet of metal or metal alloy having a multiplicity of mutually spaced perforations overlies one end of the tubular housing of the deionization device.

* * * * *